March 9, 1965  A. U. WELCH  3,173,112
THREE-PHASE REACTOR
Filed Dec. 26, 1962
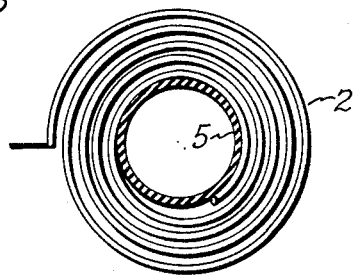
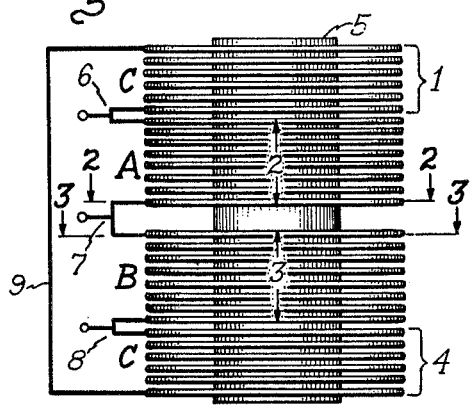
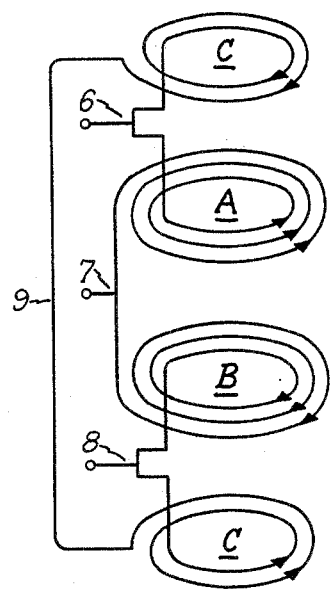
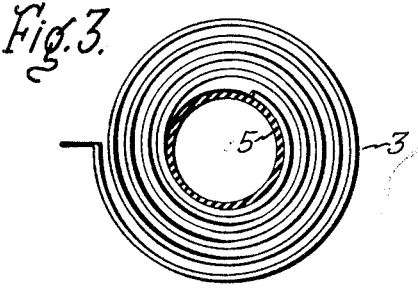
Inventor,
Alanson U. Welch,
by Gilbert P. Tarleton
His Attorney.

United States Patent Office 3,173,112
Patented Mar. 9, 1965

3,173,112
THREE-PHASE REACTOR
Alanson U. Welch, Pittsfield, Mass., assignor to General
Electric Company, a corporation of New York
Filed Dec. 26, 1962, Ser. No. 247,169
1 Claim. (Cl. 336—12)

This invention relates to three-phase reactors and more particularly to improvements in coreless shunt reactors of the three-phase type.

As its name implies, a coreless reactor has no core of magnetic material and it is sometimes called an air core reactor. Also, as its name implies a shunt reactor is for connection across or in shunt with an electric circuit such as a commercial frequency power supply system where one of its uses is to supply line charging current, usually with the requirement of drawing balanced three-phase current. The phase windings of such a reactor are coaxially aligned and heretofore have been star or Y-connected for three-phase operation. The principal determinant of the space between windings is the distance required for insulation purposes and as power system voltages are increasing the space between phase windings becomes a foot or more which limits the voltage rating by making a large rating impractically long axially or tall if the axis is vertical as is usually the case.

In accordance with this invention, the spacing between phases is made practically independent of voltage, and thus negligible in practice, by connecting the phases in delta so that the voltage rating can be greatly increased without exceeding practical height or axial length dimensions. Also, the amount of copper or other conductive material required to be used in the coils or windings is substantially reduced because of the higher mutual inductance resulting from the decreased spacing between coils or windings.

An object of the invention is to provide a new and improved three-phase coreless shunt reactor.

Another object of the invention is to provide a low height or axial length height voltage three-phase coreless shunt reactor.

A further object of the invention is to eliminate the spacing heretofore required for insulation purposes between the phase windings of a three-phase coreless reactor.

An additional object of the invention is to reduce the amount of copper, or other conductive material, used in the windings of a three-phase coreless reactor.

The invention will be better understood from the following description taken in connection with the accompanying drawing and its scope will be pointed out in the appended claim.

In the drawing,

FIG. 1 is a side view of an embodiment of the invention,

FIG. 2 is a sectional view on line 2—2 of FIG. 1,

FIG. 3 is a sectional view on line 3—3 of FIG. 1 and

FIG. 4 is a schematic diagram of the embodiment shown in FIG. 1.

Referring now to the drawing and more particularly to FIG. 1 the reactor comprises four distinct conductive coils 1, 2, 3, and 4. These may be mounted on an insulating cylinder 5 which maintains them in coaxial alignment. Each coil consists of a plurality of disc wound sections, the lowermost section in coil 2 being shown in FIG. 2 and the uppermost section in coil 3 being shown in FIG. 3, for example. The disc sections are usually circular in cross section and are serially connected in each coil. An advantage of circular shape is that it gives the most kva for the minimum amount of copper or other conductor material. However, there can be certain designs made with magnetic steel shielding of such shape that coils more nearly rectangular might be more desirable.

The coils 2 and 3 are respectively the windings for phases A and B of a three-phase system or circuit. The coils 1 and 4 collectively are the winding of phase C of the three-phase system. The coils 1 and 2 have the same number of turns and the sum of the turns in coils 1 and 2 is slightly more than the number of turns in either coil 2 or coil 3 so as to make the self-inductance of phase winding C equal to the self-inductance of phase windings A and B.

The coils or phase windings are all serially connected in a closed loop by means of three combined reactor terminals 6, 7 and 8 and short connectors between adjacent ends of the adjacent coils. Thus the element 6 not only serves as one terminal of the three-phase reactor but also serves to interconnect coils 1 and 2. The element 7 not only serves as one terminal of the reactor but also serves to interconnect coils 2 and 3 and member 8 not only serves as the third terminal of the reactor but also serves to connect coils 3 and 4. The loop or delta connection is closed by a long connector 9 between the outer ends of the coils 1 and 4. As is known in the art, a three-phase shunt reactor with uniform self-inductance of phases and uniform mutual inductance between pairs of phases will draw balanced three-phase current from the line.

As there is no voltage difference between the adjacent ends of coils 1 and 2 due to their direct interconnection by member 6, they are placed directly adjacent each other with no intermediate spacing for insulation purposes, and the same is true for coils 3 and 4. A small gap, however, is provided between coils 2 and 3, not for insulation purposes, but to obtain balanced mutual inductance. This gap will be of the order of one to two inches.

The principal reason for using disc wound sections in the coils is that in proceeding radially inwardly across the end faces of the coils from their short interconnections by members 6, 7 and 8 the maximum voltage difference between adjacent coils is merely the section voltage, whereas if the coils were layer wound this voltage difference could be substantially the full voltage of each coil.

Alternate coils are wound in opposite directions so that the mutual inductance voltages add to the self-inductance voltages and so as to make the force between coils predominantly attractive rather than repulsive. This is shown, for example, in FIGS. 2 and 3 where FIG. 2 represents the direction of winding of the sections in coil 2 and FIG. 3 represents the opposite direction of winding of the sections in coil 3. The sections in coil 1 will be wound in the same direction shown in FIG. 3 and the sections in coils 4 will be wound in the same direction shown in FIG. 2. This is also shown in the schematic diagram comprising FIG. 4. As a result of this construction, when the instantaneous value of current in any phase is zero the currents in the other two phases are equal to .866 of their maximum instantaneous value and opposite in polarity or direction to each other, but inasmuch as adjacent coils are wound oppositely their magnetic forces will be attractive in this condition. Likewise during instants when the current in any phase has its maximum value, the currents in the other two phases are equal to each other at half their instantaneous maximum value and opposite in polarity or direction to the current in the phase having the unit or maximum value current. Therefore, under these conditions, the predominant force will be attractive.

Large shunt reactors, like other large stationary induction apparatus, are often immersed in cooling and insulating fluid, such as mineral oil, contained in an enclosing casing or tank of steel. In those cases, it is also conventional to employ magnetic flux shielding means of either the magnetic or non-magnetic types, with phase balance maintained by taking into account the effect of the shield on the various inductances. It is, of course, contemplated that the present invention may be used in such oil immersed shielded reactors.

While there has been shown and described a particular embodiment of the invention, it will be obvious to those skilled in the art that changes and modifications may be made without departing from the invention, and therefore it is intended by the appended claim to cover all such changes and modifications as fall within the true spirit and scope of the invention.

What I claim as new and desire to secure by Letters Patent of the United States is:

A delta connected coreless shunt reactor for a three-phase electric circuit comprising, in combination, four coaxially aligned disc section conductor coils serially connected together in a closed loop circuit by three short connectors between adpacent ends of adjacent coils and a long connector between the outer ends of the two outer coils, said three short connectors constituting also external reactor terminals, the two inner coils respectively being phase A and phase B windings and the two outer coils collectively being the phase C winding of a delta coil connection between said terminals, there being negligible axial separation between the inner end faces of the phase C coils and their respectively adjacent outer end faces of the phase A and B coils, the total number of turns of the phase C coils being equally divided between them and enough greater than the number of turns of the respective other phase coils to make the self-inductance of the phase C coils collectively equal to the self-inducance of the phase A and B coils respectively, there being only sufficient axial separation between the phase A and B coils to obtain balanced mutual inductance so that the reactor has uniform self-inductance of all three phases and uniform mutual inductance between all pairs of phases, adjacent coils being wound in opposite directions so that the mutual inductance voltages add to the self-inductance voltages and the peak magnetic force between adjacent coils is attractive rather than repulsive in three-phase operation.

References Cited by the Examiner
UNITED STATES PATENTS 1,204,377 11/16 Peters _____ 307—35
2,980,874 4/61 Tarbox _____ 336—232 X LARAMIE E. ASKIN, *Primary Examiner.*
JOHN F. BURNS, *Examiner.*